XR 2,920,136 SR
SEARCH ROOM

SUBSTITUTE FOR MISSING XR

INFRARED TELESCOPE

Filed June 22, 1955 3 Sheets-Sheet 1

Charles W. Peterson
INVENTOR.
BY A. D. O'Brien
W. O. Quesenberry
ATTORNEYS

INFRARED TELESCOPE

Filed June 22, 1955 3 Sheets-Sheet 2

Charles W. Peterson
INVENTOR.

BY [signature] [signature]
ATTORNEYS

INFRARED TELESCOPE

Filed June 22, 1955 3 Sheets-Sheet 3

Charles W. Peterson
INVENTOR.

BY E. D. O'Brien
W. O. Quesenbery
ATTORNEYS

United States Patent Office 2,920,136
Patented Jan. 5, 1960

2,920,136

INFRARED TELESCOPE

Charles W. Peterson, Rochester, N.Y., assignor, by mesne assignments, to the United States of America as represented by the Secretary of the Navy Application June 22, 1955, Serial No. 517,401

2 Claims. (Cl. 178—6)

This invention relates to an infrared detecting device and more particularly to an infrared telescope for enabling the human eye to visualize distant objects emitting infrared radiations.

According to the present invention, the infrared rays emitted from an object are focused on an infrared detecting device. The detecting device is mechanically vibrated in the plane of the infrared image focused thereon to thereby scan the image. The electrical energy generated by the detecting device in response to the presence of the infrared rays is amplified and applied to an image reproducing light source to control the intensity thereof. Vibrations identical to said mechanical vibrations in direction and extent are imparted to a focusing means for the image reproducing light source. By using an electron tube generating ultraviolet light as the reproducing light source and a fluorescent screen on which the reproduced image is focused, the reproduced image is visible to the human eye. The image thereby reproduced is identical to the image scanned by the detecting device. By utilizing an optical microscope of suitable magnification, the visual image can be enlarged to facilitate viewing.

The primary object of the present invention is, therefore, to provide an infrared telescope for enabling the human eye to visualize objects emitting infrared radiations.

A further object of the present invention is to provide an infrared telescope in which infrared energy emitted by a distant object is focused and imaged on an infrared detecting device and in which an image identical to the infrared image is reproduced for visual observation by the human eye.

A still further object of the present invention is to provide an infrared telescope in which the mechanical vibrations applied to the infrared detecting device are applied to the means for focusing the light from a reproducing light source and the electrical energy generated by the detecting device in response to the scanned infrared image is amplified and applied to the reproducing light source to control the intensity of the same.

Still other objects and advantages of the present invention will become apparent to those skilled in the art from the following description with reference to the drawings in which like characters denote like parts and in which Fig. 1 is an elevation view, partly in section, of the preferred embodiment of my invention and showing the general relationship existing between the parts;

Figure 1:
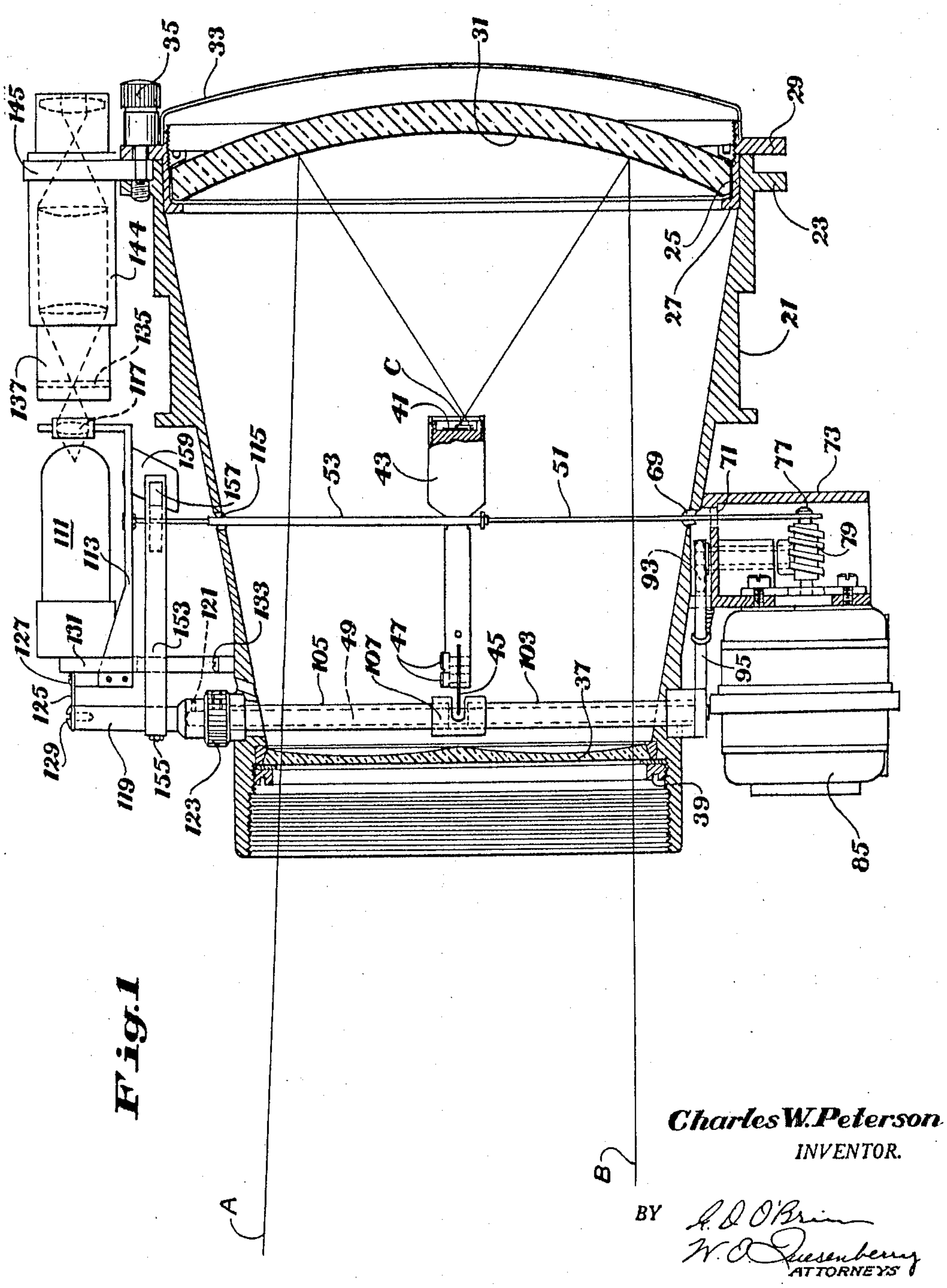
Figure 2:
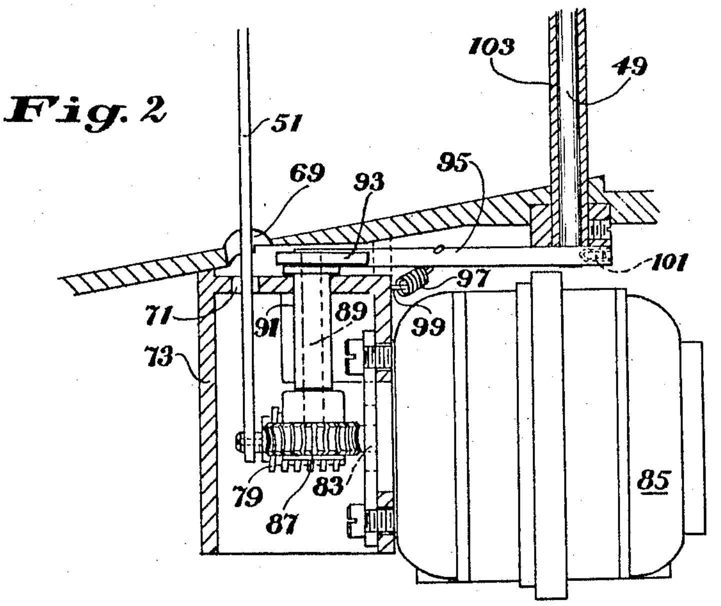
Figs. 2 and 3 are enlarged elevation and plan views respectively of the motor and driving gears shown in Fig. 1.
Figure 3:
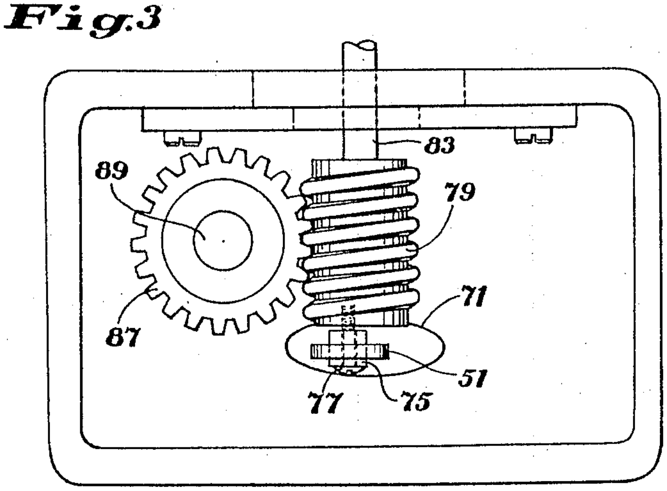
Figures 4, 5, 6, 7, 8:
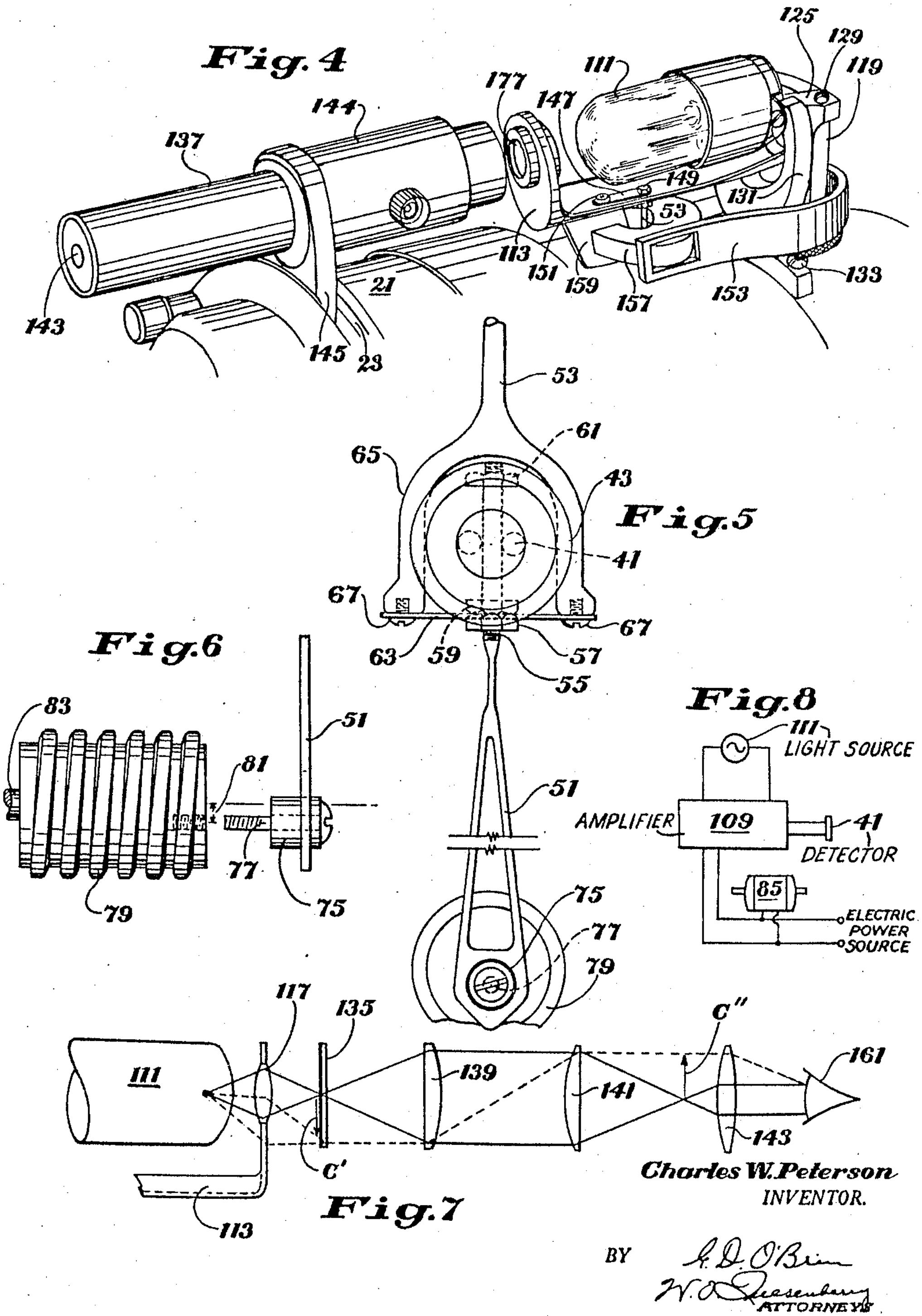
Fig. 4 is a perspective view of the reproducing light and viewing microscope arranged according to my invention.
Figs. 5 and 6 are enlarged detail views of the mechanical connections between the motor and the infrared detecting device.
Fig. 7 is an elevation view of the reproducing light and viewing microscope showing the relationship existing between the lenses.
Fig. 8 is a block diagram of the wiring circuit utilized in my invention.

The invention as disclosed in Fig. 1 comprises a casing 21 provided with an annular flange 23 on the rearward end thereof. On this same end, casing 21 is provided with an internal cylindrical bore 25 which receives cylindrical member 27 having an annular flange 29 formed thereon. Cylindrical member 27 carries a spherically concave mirror 31 having its optical axis coincident with the geometric axis of casing 21. Cylindrical member 27 also carries an end cap 33 which encloses the rear surface of mirror 31. Cylindrical member 27 is secured in position in cylindrical bore 25 by means of knurled screws 35 (only one of which is shown) which pass between flanges 23 and 29. In the forward end of casing 21, an infrared transmitting Schmidt corrector plate 37 is retained in position by means of a threaded ring 39. The optical axis of the Schmidt corrector plate 37 coincides with the optical axis of mirror 31. A small infrared sensitive detecting device 41 is mounted on a vibrator element 43 which is supported within the casing 21 in a position such that detecting device 41 lies in the focal plane of mirror 31. The forward portion of vibrator element 43 is supported by means of a flat spring 45 which is rigidly attached to the vibrator element 43 by screws 47 and which is rigidly fixed to rocking shaft 49. The rearward portion of vibrator element 43 is supported by lower reciprocating rod 51 and by upper reciprocating rod 53 as is more clearly illustrated in Fig. 5. The upper end of lower reciprocating rod 51 is threaded to receive nuts 57, 59 and 61. A flat torsion spring 63 is retained between nuts 57 and 59 and is affixed to the U-shaped end 65 of upper reciprocating rod 53 as by means of screws 67. Vibrator element 43 is supported on the threaded end 55 of lower reciprocating rod 51 between nuts 59 and 61. The other end of lower reciprocating rod 51 protrudes through apertures 69 and 71 formed in the casing 21 and gear housing 73 respectively, and is pivotally supported on a bearing 75 on crank pin 77 which is threaded into the end of worm 79 and offset from the rotational axis thereof by suitable distance 81 as is illustrated in Fig. 6. The worm 79 having only a single thread, is mounted on the armature shaft 83 of motor 85 and directly driven thereby. A worm gear 87 having twenty teeth is fixed to rotatable shaft 89 and meshes with and is driven by worm 79 as is best illustrated in Figs. 2 and 3. Shaft 89 is carried within a bearing housing 91. The other end of shaft 89 carries a heart cam 93 fixed thereon and in peripheral engagement with a cam follower (not shown) which is mounted on the adjacent end of rocking lever 95. A light tension spring 97 is attached to rocking lever 95 and to a pin 99 projecting from the housing 73 which encloses the gears 79 and 87. Rocking lever 95 is rigidly attached to rocking shaft 49 at the lower end thereof, by means of a set screw 101. Rocking shaft 49 is enclosed within a stationary lower shaft housing 103 and a stationary upper shaft housing 105. Shaft housing 103 and 105 are joined by a suitable connector 107 adjacent the connection of flat spring 45 and rocking shaft 49 as illustrated in Fig. 1.

The detecting device 41 is connected to a unidirectional potential source (not shown) and the electronic amplifier 109 as is schematically illustrated in Fig. 8. The motor 85 is connected in parallel with the electric power input to the amplifier and the output of the amplifier is connected to an ultraviolet reproducing light source 111. For purposes of clarity, the actual connecting wires from detecting element 41 and to the light source 111 and to motor 85 have not been shown in the other figures of the drawings.

Reproducing vibrator element 113 is supported by the portion of upper reciprocating rod 53 which protrudes through an aperture 115 provided in casing 21. Vibrator element 113 carries on one end thereof an ultraviolet transmitting lens 117 made of a material such as for example quartz, positioned so as to receive and transmit the ultraviolet light emitted from the light source 111. The other end of vibrator element 113 is flexibly fastened to an extension 119 which is attached rigidly by means of a set screw 121 to the part of rocking shaft 49 which extends through a bearing 123 outside of casing 21. For this purpose, the extension 119 is widened to permit two connecting spring metal strips 125, which are attached by screws 127 to vibrator element 113, to be fastened by screws 129 thereto. As illustrated in Fig. 1, the medial plane of lens 117 coincides with the plane of detecting device 41, and the distance from the plane of detecting device 41 to the axis of movement of rocking shaft 49 is exactly equal to the distance from the medial plane of lens 117 to the axis of movement of extension 119 of rocking shaft 49. Similarly the distance from the plane of detecting device 41 to the place on vibrator element 43 at which reciprocating rod 51 is attached, is exactly equal to the distance from the medial plane of lens 117 to the place on reproducing vibrator element 113 at which reciprocating rod 53 is attached. Because of these equalities of distances, movement imparted to detecting device 41 is duplicated by lens 117. However, it is not essential to the practice of the invention that these equalities be maintained, since in some cases it may be desirable to magnify or reduce the movements of lens 117 with respect to the movements of detector 41. It is only necessary that like movements of each be kept proportional.

Reproducing ultraviolet source 111 is supported in position in optical alignment with lens 117 by means of a support bracket 131 which is fastened to casing 21 by screws 133. By utilizing an ultraviolet light source 111 which is of a small area such as to be equivalent to a point source, the image reproduced on fluorescent screen 135 where it is focused by lens 117 is more sharply defined. The Sylvania 1B59/R1130B tube with special gas and envelope has proved to be very satisfactory for this purpose. The use of fluorescent screen 135 results in the image of ultraviolet light formed by lens 117 on screen 135 to be reproduced on the screen 135 in light visible to the human eye. A viewing microscope 137 comprising erecting lenses 139 and 141, and an eyepiece 143, is positioned in optical alignmnet with the fluorescent screen 135 in order to erect the inverted image formed on screen 135 and to magnify the image in order to make it readily discernible to the human eye. Microscope 137 is adjustably supported in this position in a tube 144 which is fastened to and carried by bracket 145. Bracket 145 is attached to annular flange 23 of casing 21 by means of screws, not shown.

As is best illustrated in Fig. 4, reproducing vibrator element 113 is not directly attached to upper reciprocating rod 53. Instead rod 53 is fastened to one end of a leaf spring 147 by a nut 149 threaded on rod 53. The other end of leaf spring 147 is fastened by a screw 151 to vibrator element 113. Bracket 153 is rigidly secured to extension 119 over rocking shaft 49 by means of screws 155 as illustrated in Fig. 1. Bracket 153 extends around support bracket 131 and holds a relatively strong magnetic field producing horseshoe magnet 157 between its extended ends. On the underside of reproducing vibrator element 113, a relatively thick aluminum plate 159 is attached in a manner such that the plate 159 occupies a position between the open ends of magnet 157. The reason for this construction will be hereinafter explained.

The actual operation of my invention will now be described. In Fig. 1 the characters A and B designate the limiting rays of infrared energy from respectively the top and bottom of a distant object. Rays A and B pass through the infrared transmitting Schmidt corrector plate 37, are reflected from the mirror 31, and are imaged on detecting device 41. The image has been illustrated in Fig. 1 as an inverted arrow and designated by the character C. The energy produced by the infrared detecting device 41 as a result of the striking infrared energy is applied to and amplified by amplifier 109. The amplified signal from the output of amplifier 109 is applied to the reproducing light source 111. Thus the intensity of the point source of ultraviolet light from the light source 111 is proportional to and controlled by the intensity of the signal generated by the infrared energy which strikes detecting device 41.

The motor 85 which I have successfully utilized, rotates at the speed of 1800 revolutions per minute. Thus reciprocating rod 51 imparts a vertical reciprocatory sinusoidal movement of 30 cycles per second to vibrator element 43 and hence to the detecting device 41 as the result of the connection of rod 51 to the rotating worm 79 by means of crank pin 77. Heart cam 93 is rotated by shaft 89 which is driven by worm 79 through worm gear 87. The rotation of heart cam 93 is at the rate of 1½ cycles per second and is transmitted to rocking shaft 49 through the cam follower (not shown) and rocking lever 95. The rocking movement of rocking shaft 49 is imparted to vibrator element 43 through spring 45 and hence to the detecting device 41 resulting in the horizontal rocking of detecting device 41 at the rate of 1½ cycles per second. These two movements, that is, the vertical reciprocating and horizontal rocking movements, of detecting device 41 occur in the plane of the infrared image C which is focused by mirror 31 onto the surface of detecting device 41 and enables detecting device 41 to scan the infrared image C. As was set forth supra, the movements imparted to detecting device 41 are proportional to, or duplicated in direction and extent by the movements of lens 117. Therefore, an ultraviolet light image C′ having the configuration of the scanned infrared image C is focused on fluorescent screen 135 by lens 117. Since infrared image C is inverted on detecting device 41, the ultraviolet image C′ is also an inverted image. The utilization of a fluorescent screen 135 having an effective phosphorescent persistence of approximately one second or more is desirable in order that the luminous reproduction as seen by the human eye does not flicker. It is in order to eliminate the flicker that I prefer to use an ultraviolet light source rather than a light source which emits visual light.

Because of the fact that there is a slight delay in the response of the infrared detecting device 41 to the scanned infrared image C and the fact that the output signal of the usual electronic amplifier lags in phase slightly behind the input signal to the amplifier, it is desirable to provide a mechanical lag of about 1/240 second in the vertical reciprocatory movement of lens 117. This is accomplished through the connection of rod 53 to reproducing vibrator element 113 by the leaf spring 147 as described supra, and the utilization of a magnetic eddy current power drag produced by the vertical reciprocatory movement of aluminum plate 159 in the relatively strong magnetic field produced between the open ends of magnet 157. The time lag in the vibration of vibrator element 113 can be varied as desired by merely varying the strength of leaf spring 147. For example, a longer time lag is obtained by utilizing a weaker leaf spring 147, and a shorter time lag is obtained by utilizing a stronger spring 147. The necessity of providing a mechanical time lag arises only for the vertical reciprocating movements of vibrator elements 43 and 113 in which the upward movement is followed by the downward movement by only 1/60 second and not for the horizontal rocking movements of vibrator elements 43 and 113 in which movement to the left follows movement to the right by ⅓ second.

The image C′ visible on fluorescent screen 135, is viewed through erecting microscope 137 and is intelligible to the human eye, designated 161 in Fig. 7, as an erect and enlarged image C″ of the distant infrared emitting object.

While I have disclosed the invention utilizing an ultraviolet point source as the reproducing light source, an ultraviolet transmitting lens and a fluorescent screen, it is possible to utilize an ultraviolet light source of greater area, to replace the lens by a pinhole and to position the fluorescent screen very close to the pinhole. The image thus produced can be advantageously viewed through an erecting microscope as in the preferred embodiment. Similarly a point source of visible light can be utilized instead of the ultraviolet reproducing light source. In this event the fluorescent screen is removed or replaced by a ground glass screen and the ultraviolet transmitting quartz lens is replaced by a glass lens. As was noted supra, this modification is subject to an undesirable flicker in the reproduced image. Still another modification would be to utilize a source of visible light together with a pinhole instead of a lens, and a ground glass screen. As a further modification other forms of optical telescopes such as a refracting telescope or one with a parabolic mirror could be used to focus the infrared rays from the distant object onto the detecting device.

Since these and other variations of the illustrated embodiment of my invention are possible and will be readily recognized by those skilled in the art, the present disclosure is only illustrative and the scope of the invention is defined by the appended claims.

Having now particularly described my invention what I desire to secure by Letters Patent of the United States and what I claim is:

1. An infrared telescope comprising a hollow housing, an infrared detecting device mounted for limited movement within said housing, means mounted within said housing for focusing an infrared image of a distant object onto said device, oscillating means for imparting both vertical and horizontal movements to said device in the plane of said image for scanning said image, a reproducing point source of light rigidly mounted on the exterior of said housing, a viewing screen mounted on the exterior of said housing in fixed alignment with and spaced relation to said point source, means for amplifying the electrical energy generated by said device in response to said infrared image scanned thereby, means for applying said amplified electrical energy to said source and thereby control the intensity of said source, a lens for focusing light emitted by said light source onto said screen, said lens being supported in a mounting bracket over said exterior of said housing for movement with respect to said point source, and rod means passing through said housing and interconnecting said device and said mounting bracket for transmitting said movements of said device to said lens, the movements imparted t said lens being identical in direction and extent to th movements of said device whereby a visible image iden tical to said infrared image is reproduced on said scree by said light source.

2. An infrared telescope comprising a generally tubu lar housing, an infrared detecting device mounted alon the longitudinal axis of said housing and in a plane per pendicular to said axis, concave reflecting means mounte symmetrically about said axis and within said housin for focusing an infrared image of a distant object i the field of said reflecting means onto said device, oscil lating means for imparting to said device both vertica and horizontal movements in said plane for scanning sai image, a reproducing point source of ultraviolet ligh rigidly mounted on the exterior of said housing, a fluores cent screen fixed on said exterior of said housing an mounted in alignment with and spaced relation to sai point source, means for amplifying the electrical energ generated by said device in response to the infrare image scanned thereby, the output of said amplifyin means lagging the input thereto by a predetermined time means for applying said amplified electrical energy t said source and thereby control the intensity of sai source, an ultraviolet light transmitting lens for focusin light emitted by said point source onto said screen, sai lens being supported in a mounting bracket over said ex terior of said housing for movement with respect to sai point source, rod means passing through said housin and interconnecting said device and said mounting brack et for transmitting said movements of said device to sai lens, the movements imparted to said lens being identica in direction and extent to the movements of said device and damping means interconnecting said rod means an said mounting bracket for mechanically delaying th movements of said lens for a time equal to said predeter mined time whereby a visible image identical to sai infrared image of said object is reproduced on sai screen.

References Cited in the file of this patent

UNITED STATES PATENTS

| | | |
|---|---|---|
| 1,702,195 | Centeno | Feb. 12, 192 |
| 2,009,498 | Kerr | July 30, 193 |
| 2,028,475 | Rockwell | Jan. 21, 193 |
| 2,075,808 | Fliess | Apr. 6, 193 |
| 2,225,044 | George | Dec. 17, 194 |
| 2,370,163 | Hare | Feb. 27, 194 |
| 2,458,865 | Malm | Jan. 11, 194 |

FOREIGN PATENTS

| | | |
|---|---|---|
| 412,905 | Great Britain | Sept. 26, 193 |